United States Patent Office 3,503,758
Patented Mar. 31, 1970

3,503,758
FLAVORING COMPOSITION
Shyozo Wada, Mino, Hiromi Nakatani, Kobe, and Jun Toda, Nishinomiya, Japan, assignors to Takeda Chemical Industries, Ltd., Osaka, Japan
No Drawing. Filed Oct. 14, 1966, Ser. No. 586,628
Claims priority, application Japan, Oct. 14, 1965, 40/63,139; Feb. 8, 1966, 41/7,547; May 19, 1966, 41/32,256
Int. Cl. A23l 1/22, 1/26
U.S. Cl. 99—140           2 Claims

ABSTRACT OF THE DISCLOSURE

A flavoring composition for foodstuffs composed of a flavor enhancing amount (about 0.002 to 2.09% by weight) of a compound of the formula:

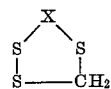

wherein X may be —CH$_2$—S—, —S—CH$_2$—,

—CH$_2$—S—CH$_2$— or —S—CH$_2$—S— and a major amount of an edible carrier for such compound.

---

The present invention relates to a novel flavoring composition and a method for improving or enhancing flavor of foodstuffs.

Recently, various chemical condiments such as sodium glutamate, 5'-ribonucleotide and succinic acid have been employed as flavor enhancers for foodstuffs.

However, these chemical condiments, although they have strong flavoring effects, leave something to be desired from the standpoint of good aroma. Therefore, chemical flavoring enhancers which are bound up also with good aroma are sought in the field of flavoring for foodstuffs.

According to the present invention, it has been found that a compound represented by the formula

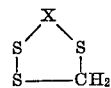    (I)

wherein X is —CH$_2$—S—, —S—CH$_2$—,

—CH$_2$—S—CH$_2$— or —S—CH$_2$—S—, has a good aroma even at a rather low concentration.

Furthermore, it has been found that compound I has the effect of developing or enhancing the original flavors of the various natural and chemical condiments.

It is an object of the present invention to provide novel flavoring compositions containing one or more compounds I.

Another object of this invention is to provide a method for improving or enhancing the flavor of foodstuffs with the aid of compound(s) I.

Other objects will become apparent from the detailed description hereinafter provided.

The compounds represented by the Formula I (hereinafter referred to as "compounds I") comprise the following four compounds:

| Name | Chemical structure | Melting point (°C) |
|---|---|---|
| 1,2,3,5,6-pentathiepane (lenthionine) |  | 60–61 |
| 1,2,3,5-tetrathiane | | 86 |
| 1,2,4,6-tetrathiepane | | 130–133 |
| 1,2,4,5-tetrathiane |  | 82 |

Among these compounds I, 1,2,4,5-tetrathiane can be prepared after the method described on pages 1455–1462 of "Chemische Berichte," vol. 98 (1965). The other compounds can be prepared, for example, by allowing hydrogen polysulfide or an alkali metal salt or alkaline earth metal salt thereof to react with an active methylene compound represented by the formula:

$$\underset{Y}{\overset{X}{\diagdown}}CH_2 \qquad (II)$$

wherein each of X and C is halogen atom, —SCl or —SSO$_3$M (M being alkali metal); or either X or Y is hydroxyl and the other is —SO$_2$M or —SO$_3$M (M being alkali metal); or X and Y together represent oxygen.

The hydrogen polysulfide or its salt is represented by the formula $$M'_2S_w \qquad (III)$$

wherein M' is H, an alkali metal (e.g. sodium, potassium, etc.) or alkaline earth metal (e.g. calcium, magnesium, etc.) and $w$ is a positive number greater than 2. In this Formula III, when $w$ represents a number having a fractional part, the hydrogen polysulfide or its metal salt is a mixture consisting of the compounds III having various numerical values of $w$. In these reactions, though there may be employed any hydrogen polysulfide or its metal salt with an optional value of $w$ in Formula III, it is generally preferable to employ the compound or compounds represented by the Formula III wherein $w$ has a value of $2+$ but not greater than 3.

As active methylene compounds, there are exemplified formaldehyde, thioformaldehyde, dichloromethane, dibromomethane, difluoromethane, diiodomethane, formaldehyde sulfoxylate, $\alpha$-hydroxymethylsulfonate, etc.

The reaction is generally carried out in a solvent medium (e.g. water, methanol, ethanol, ether, acetic acid, benzene, xylene, toluene, chloroform, dichloromethane, etc.) or a mixture thereof. The reaction is carried out usually at room temperature (20 to 35° C.) although the reaction may be carried out under cooling or heating, if it is desired to control the reaction velocity. When formaldehyde or thioformaldehyde is used as active methylene compound, the reaction proceeds smoothly at pH about 2 to 10. The reaction may be accelerated, if desired, by the addition of inorganic salts or inorganic or organic acids (e.g. hydrochloric acid, sulfuric acid, phosphoric acid, acetic acid, propionic acid, butyric acid, formic acid, benzoic acid, phenylacetic acid, phthalic acid, succinic acid, maleic acid, tartaric acid, sulfonic acids, amino acids, carboxylic or sulfonic acid resins, etc.). On the other hand, when dihalogenomethane is used as the active methylene compound, it is desirable to carry out the reaction in the alkaline pH range.

From the reaction mixture thus produced, lenthionine, 1,2,3,5-tetrathiane and 1,2,4,6-tetrathiepane are separated by a per se known conventional purification method, for example, recrystallization, extraction, chromatography, distillation or sublimation. These purification methods may be applied separately or in combination or repeatedly. For example, after separating the solvent layer containing the objective compounds from the reaction mixture or extracting the reaction mixture with solvent as mentioned below, the solvent layer is washed with water, dried and concentrated under reduced pressure. The oily residue obtained is chromatographed on silica gel and developed with normal-hexane to collect the fractions respectively containing lenthionine, 1,2,3,5-tetrathiane and 1,2,4,6-tetrathiepane eluted in this order. Each fraction is combined and concentrated to dryness under reduced pressure to obtain the objective compound as crystals respectively. Examples of preparation follow. Throughout, in the following, the relationship between parts by weight and parts by volume is the same as that between grams and milliliters.

Example A

In a solution of 30 parts by weight of sodium sulfide in 100 parts by volume of distilled water, 6 parts by weight of sulfur was dissolved by heating on a water bath. To the resultant solution containing sodium polysulfide, 20 parts by weight of a 37% aqueous formaldehyde solution and 100 parts by volume of chloroform were added, and then acetic acid was gradually dropped into the mixed-solution under stirring. After the reaction was over, the chloroform layer was separated out. Thus-separated layer was washed with water and dried over sodium sulfate, and further subjected to evaporation under reduced pressure to obtain 4.5 parts by weight of pale-yellow oily residue, which was purified by extraction with chloroform and, after filtering off insoluble inorganic sulfur, the solvent was evaporated off under reduced pressure to yield 1.5 parts by weight of colorless oily substance. The oily substance was chromatographed on a column of silica gel and developed with normal-hexane to collect the fractions containing lenthionine. Thus-collected fractions were combined nad concentrated under reduced pressure to obtain 0.3 part by weight of lenthionine as white crystals melting at 54–56° C.

Example B

In a solution of 24 parts by weight of sodium sulfide ($Na_2S \cdot 9H_2O$) in 20 parts by volume of water, 48 parts by weight of sulfur was dissolved under heating on a water bath. The resultant solution containing sodium polysulfide was gradually added to a solution of 14 parts by weight of diiodomethane ($CH_2I_2$) in 40 parts by volume of ethanol under stirring and the mixture was further stirred for 4 hours to allow completion of the reaction. The resultant mixture was poured into 200 parts by volume of water. The mixture was extracted with chloroform and the extract was concentrated under reduced pressure to obtain 1 part by weight of colorless oily substance, which was treated by column chromatography on silica gel and was then developed with normal-hexane. The fractions containing lenthionine were collected and the solvent was evaporated off under reduced pressure to obtain 0.3 part by weight of lenthionine as colorless prisms melting at 60 to 61° C.

Example C

To a solution of 300 parts by weight of sodium sulfide in 1000 parts by volume of distilled water, 60 parts by weight of sulfur was added and the mixture was warmed on a water bath to dissolve the sulfur completely. The solution was adjusted to pH 8 by introducing hydrogen sulfide under ice-cooling. Thus-obtained aqueous sodium polysulfide (pH=8) was added to 1000 parts by volume of dichloromethane and the mixture was vigorously stirred for 7 hours at room temperature.

Dichloromethane layer was separated out, washed with water and dried over sodium sulfate. The solvent was removed from the dichloromethane layer by evaporation under reduced pressure to obtain 33 parts by weight of yellow oily substance, from which crystals of lenthionine precipitated after being left standing in a refrigerator. The crystals collected by filtration were recrystallized from a mixture of dioxane and chloroform to obtain 10 parts by weight of pure lenthionine melting at 61° C.

Example D

To a solution of 90 parts by weight of sodium sulfide in 150 parts by volume of distilled water, was added 18 parts by weight of sulfur and the mixture was warmed on a water bath to dissolve the sulfur completely. After cooling, to the resultant solution, 20 parts by weight of ammonium chloride and then 150 parts by volume of dichloromethane were added, and the mixture was stirred vigorously for 7 hours at room temperature. The dichloromethane layer was separated out, washed with water and dried on sodium sulfate. The solvent was removed from thus-treated dichloromethane layer by evaporation under reduced pressure to obtain 2.5 parts by weight of yellow oily substance. The oily substance was treated by column chromatography on silica gel and devolped with normal-hexane. From the fraction containing lenthionine, 0.3 part by weight of pure lenthionine melting at 61° C. was obtained.

Example E

In a solution of 30 parts by weight of sodium sulfide in 100 parts by volume of distilled water, 6 parts by weight of sulfur was dissolved by heating on a water bath. To the resultant solution containing sodium polysulfide, 20 parts by weight of a 37% aqueous formaldehyde solution and 100 parts by volume of chloroform were added, and then acetic acid was gradually dropped into the mixed-solution under stirring. After the reaction was over, the chloroform layer was separated out. Thus-separated layer was washed with water and dried over sodium sulfate, and further subjected to evaporation under reduced pressure to obtain 4.5 parts by weight of pale-yellow oily residue, which was purified by extraction with chloroform and, after filtering off insoluble inorganic sulfur, the solvent was removed by evaporation under reduced pressure to yield 1.5 parts by weight of colorless oily substance. The oily substance was chromatographed on a column of silica gel and developed with normal-hexane. At first, the fraction containing lenthionine was eluted, then the fraction containing 1,2,3,5-tetrathiane and lastly the fraction containing 1,2,4,6-tetrathiepane. These fractions were respectively concentrated under reduced pressure and the respective resultant residues were purified by sublimation to give lenthionine (melting at 61° C.), 1,2,3,5-tetrathiane (melting at 86° C.) and 1,2,4,6-tetrathiepane (melting at 82° C.), respectively.

Example F

In a solution of 30 parts by weight of sodium sulfide in 100 parts by volume of distilled water, 6 parts by weight of sulfur was dissolved by heating on a water bath. To the resultant solution containing sodium polysulfide, after cooling, there was added 100 parts by volume of dichloromethane and the mixture was stirred vigorously at room temperature for 7 hours. Then the dichloromethane layer was separated out from the reaction mixture. From the dichloromethane layer, after it was washed with water and dried with sodium sulfate, the solvent was removed under reduced pressure to give 3.5 parts by weight of yellowish oily substance, from which 1 part by weight of crystals of 1,2,4,6-tetrathiepane was precipitated upon standing in a refrigerator. Melting point: 82° C.

Compounds I are hardly soluble in water (e.g. the saturated aqueous solution of lenthionine at 25° C. contains only 0.0017% of lenthionine), but they are soluble in alcohol (e.g. ethanol, ethylene glycol, propylene glycol, etc.) in a concentration of several thousand p.p.m. (parts per million), in organic acids (e.g. linoleic acid, linolenic acid, etc.) and in vegetable oils (e.g., salad oil, safflower oil, soybean oil, etc.) in a concentration higher than about 1%, and in certain organic solvents (e.g. benzene, chloroform, dichloromethane, etc.) in even higher concentration.

Although these compounds I in crystalline form can be stored unchanged for a relatively long time, their stability in aqueous solution varies markedly with the pH of the solution. For example, the following table shows the remaining percent of lenthionine under various pH conditions, which percent is determined by the polarographic method after the solutions are heated at 100° C. for one hour in sealed colorless ampoules (original solutions contain 0.0412 micromol of lenthionine).

| pH | Buffer-solution | Remaining percent of lenthionine |
|---|---|---|
| 1.0 | 0.1 normal-hydrochloric acid solution | 50 |
| 4.0 | 0.1 mol-acetic acid buffer solution | 109 |
| 4.9 | do | 70 |
| 6.9 | 0.1 mol-phosphoric acid buffer solution | 0 |
| 9.3 | 0.1 mol-boric acid buffer solution | 0 |
| 13.0 | 0.1 normal-sodium hydroxide solution | 0 |

The following graph shows another example of the stability of lenthionine: In this example, lenthionine was dissolved at a concentration of 0.0412 micromole in a buffer prepared by modifying Clark-Lubs buffer by replacing 10% by volume of water with the corresponding volume of ethyl alcohol, the pH varying from 2 to 9. The solution was heated at 100° C. for one hour in sealed ampoules. After cooling, the lenthionine in the solution was determined by the polarographic method. As can be seen from the graph, the stability of lenthionine is markedly affected by the pH of the solutions. It is fairly stable in the range pH 2 to 4, but in a solution above pH 5.5, it decomposes very rapidly.

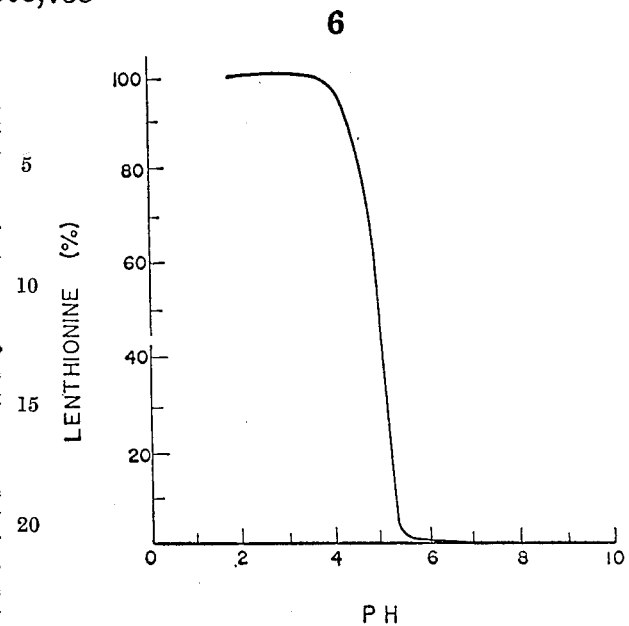

When an aqueous solution (pH 5.5) containing 0.0412 micromol and 10% ethanol is stored for 40 days at 4 to 5° C. in a dark place, there remains 100% of lenthionine, while in the case of an aqueous solution of pH 13.0 containing the same, the remaining percent of lenthionine is as follows:

| Time at 25° C. (hours) | Remaining percent of lenthionine |
|---|---|
| 0.5 | 56 |
| 1.0 | 50 |
| 3.0 | 42 |
| 24.0 | 13 |

These compounds I diffuse a good aroma and therefore they can be employed as flavor enhancers. Some examples of tests for determining their threshold values of aroma and of their use in cooking are shown as follows: in these tests 30 to 40 trained panel members participated.

Test 1

The threshold value of lenthionine is determined by the ascending series method of limits, which is determined as the minimum concentration of lenthionine sufficient for distinguishing its aroma from that of the control. In this test distilled water, an aqueous solution containing 1% sodium chloride and 0.3% Shoyu (soybean sauce) and salad oil are used as solvents for the lenthionine. The following Table 1 shows the number of answers correctly distinguishing samples from control (solvent).

TABLE 1

A. In distilled water (panel members: 27)

| Concentration of lenthionine (p.p.m.) | The number of correct answers |
|---|---|
| 0.03 | 1 |
| 0.07 | 4 |
| 0.13 | 5 |
| 0.27 | 13 |
| 0.53 | 16 |
| 1.06 | 24 |
| 2.13 | 26 |
| 4.25 | 27 |
| 8.5 | 27 |
| 17 | 27 |

B. In an aqueous solution containing 1% sodium chloride and 0.3% Shoyu (panel members: 30)

| Concentration of lenthionine (p.p.m) | The number of correct answers |
| --- | --- |
| 0.03 | 3 |
| 0.07 | 9 |
| 0.13 | 13 |
| 0.27 | 19 |
| 0.53 | 20 |
| 1.06 | 25 |
| 2.13 | 27 |
| 4.25 | 29 |
| 8.5 | 30 |
| 17 | 30 |

C. In salad oil (panel members: 30)

| Concentration of lenthionine (p.p.m) | The number of correct answers |
| --- | --- |
| 0.20 | 0 |
| 0.39 | 1 |
| 0.78 | 3 |
| 1.56 | 5 |
| 3.13 | 13 |
| 6.25 | 13 |
| 12.5 | 14 |
| 25 | 18 |
| 50 | 26 |
| 100 | 29 |

The results show that the threshold value (aroma) of lenthionine is between 0.27 and 0.53 p.p.m. in distilled water and in an aqueous solution containing 1% sodium chloride and 0.3% Shoyu. On the other hand, in salad oil, the threshold value is between 12.5 and 25 p.p.m.

Test 2

The usefulness of lenthionine as a flavor additive to various foods was examined. Lenthionine is added to four types of foods and its effect is observed by the open panel method. The threshold values of lenthionine in each tested food are shown in Table 2.

TABLE 2

| | Threshold value (p.p.m.) |
| --- | --- |
| Japanese clear soup containing Shoyu and table salt | 1 |
| Japanese egg soup (Chawan musi) | 2 |
| Chinese dish (Subuta) | 20 |
| European soup (Potage) | 1.5–2 |

Most panel members preferred dishes containing lenthionine.

Test 3

The effect of lenthionine when it is added to Chinese noodle soup is examined by the "paid test" and the result is shown in Table 3.

Sample I.—A solution of 2 mg. of lenthionine and flavor mixture [1] in 400 ml. of water.

Sample II.—A solution of 0.015 g. of sodium 5'-inosinate and flavor mixture [1] in 40 ml. of water.

TABLE 3

(Panel members: 20)

| | |
| --- | --- |
| Numbers of persons who preferred Sample I | 17 |
| Number of persons who preferred Sample II | 2 |

Only one panel member could not clearly distinguish these two samples from each other.

Test 4

The threshold values of 1,2,3,5-tetrathiane, 1,2,4,5-tetrathiane and 1,2,4,6-tetrathiepane in distilled water are determined in the same manner as Test 1. The results are shown in the following Table 4.

TABLE 4

(Panel members: 30)

| Compounds: | Threshold value (p.p.m.) |
| --- | --- |
| 1,2,3,5-tetrathiane | 1–2 |
| 1,2,4,5-tetrathiane | 1–2 |
| 1,2,4,6-tetrathiepane | 3–4 |

The compounds I may be used singly or in admixture for foodstuffs at various concentrations depending on the particular compounds I. Generally speaking, lenthionine is added to a foodstuff at a concentration range between about 0.001 to 0.00001%, while 1,2,3,5-tetrathiane and 1,2,4,5-tetrathiane are used at a concentration between about 0.001 to 0.0001%, and 1,2,4,6-tetrathiepane is used at a concentration between about 0.002 to 0.0002%.

These compounds I may be used with other chemical condiments such as nuceotides (e.g. 5' - inosinate, 5'-guanylate and 5'-xanthylate), amino acids (e.g. glutamate, glycinate, alaninate, tricholomate and ibotenate) and succinic acid. The mixing proportions of these chemical condiments with one part of the compound I fall into the range of about 0.1 to 500 parts, and more concretely, it is desirable that one part of compounds I is used with about 1 to 50 parts of nucleotides or with about 5 to 200 parts of amino acids by weight. In this manner, the compounds I can increase remarkably the seasoning effect of other chemical condiments.

The compounds I may be added to foods in their crystal form or in other solid state form (e.g. powder, granules) or in liquid state, with suitable carriers (e.g. starch, sugar, lactose, glucose, soya protein, gelatin, casein, acetal resin, polyvinylacetate resin, wax-like materials as mentioned below, and solvents as mentioned below).

Compounds I may preferably be put into practical use as fine granules consisting of wax-like materials and compounds I in a proportion of 0.002 to 2%. The wax-like materials are solid at room temperature, or materials melting at 40 to 100° C. As waxlike material there may be exemplified polyethylene glycol, polyvinyl alcohol, polyvinylpyrrolidone, polyacrylate, polymethacrylate, hydrogenated oils obtained by hydrogenation of oils (e.g. soybean oil, cottonseed oil, almond oil, castor oil, linseed oil, mustardseed oil, olive oil, orangeseed oil, apricot-kernel oil, coconut oil, corn oil, grapefruitseed oil, palm oil, palm-kernel oil, peanut oil, rapeseed oil, sunflowerseed oil, teaseed oil, sesame oil, safflower oil, ricebran oil, etc.), fats (e.g. goat tallow, mutton tallow, beef tallow, lard and butterfat), higher fatty acids (e.g. decenoic acid, docosanoic acid, stearic acid, palmitic acid, lauric acid and myristic acid), higher fatty alcohols (e.g. lauryl alcohol, cetyl alcohol and stearyl alcohol), esters of fatty acids (e.g. myricyl palmitate, cetyl palmitate, myricyl cerotate, cetyl myristate, ceryl palmitate, stearyl palmitate, stearyl myristate, glyceryl distearate, glyceryl tristearate, glyceryl monostearate, glyceryl dipalmitate, glyceryl trilaurate, glyceryl dicaprate and glyceryl monomyristate) or mixtures thereof. The wax-like material is liquefied merely by heating and/or by the use of suitable organic solvent therefor. Thus-liquefied wax-like material is mixed with compounds I singly or in admixture with other chemical condiment, and the mixture is solidified and ground to the desired particle size. In lieu of being solidified and ground, the liquefied mixture may be spray-dried or spray-crystallized. It is most suitable and convenient for practical use that the granules are in a size between 10 to 200 mesh.

Another desirable form is a solution containing 0.002 to 2% of compounds I in a solvent (e.g. water, propylene glycol, ethanol, aqueous sorbitol solution, aqueous sugar solution, vegetable oils such as cottonseed oil, sesame oil,

---

[1] The flavor mixture consists of table salt 4 g., sugar 1 g., citric acid 0.01 g., monosodium glutamate 0.3 g., powdery amino acid 0.8 g., disodium 5'-inosinate 0.015 g., and powdery fat 0.6 g.

rape oil, peanut oil, soybean oil and corn oil). It is desirable to adjust the pH value of the solution in the range of 2 to 5.5.

These flavor enhancers may contain, if desired, other chemical or natural condiments, flavors, spices, antioxidants, preservatives, surface active agents, etc.

Foods to be seasoned with compounds I or flavoring compositions containing compounds I include for example, soup, pastes (e.g. ham, sausage, steamed fish paste, etc.), meats (e.g. whale meat, poultry meat, pork, beef and mutton), milk and milk products (e.g. cow's milk, condensed milk, cheese and butter), noodles made of cereals (e.g. macaroni) and so on.

It is to be understood that the following examples are solely for the purpose of illustration and not to be construed as limitations of this invention, and that many variations may be resorted to without departing from the spirit and scope of this invention. Temperatures are all uncorrected, and percentages are all on the weight basis. The term p.p.m. means parts per million. Percentages previously mentioned are also on the weight basis.

Example 1

Skimmed milk powder 450 parts by weight, table salt 150 parts by weight, sugar 50 parts by weight, and a mixture of flavor enhancers (monosodium glutamate: disodium 5'-inosinate:disodium 5'-guanylate=9:0.5:0.5) 60 parts by weight are intimately admixed. Then the mixture is further mixed thoroughly with roux 800 parts by weight and lenthionine 0.2 part by weight and ground to obtain powder 1500 parts by weight.

15 parts by weight of thus-obtained powder, dissolved in 150 parts by volume of water, gives soup of excellent aroma and taste.

Example 2

Table salt 200 parts by weight, sugar 180 parts by weight, monosodium glutamate 150 parts by weight, disodium 5'-inosinate 0.5 part by weight and disodium 5'-guanylate 0.5 part by weight are mixed thoroughly with spices such as ginger, garlic, onion and celery. On the other hand, beef fat 1500 parts by weight and chicken fat 30 parts by weight are melted by heating above 55° C. and mixed with lenthionine 1 part by weight, which mixture is then spray-crystallized. The former is mixed thoroughly with 150 parts by weight of the latter and with potato flakes 30 parts by weight and thoroughly ground to obtain powder. The powder 10 parts by weight may be dissolved in water 180 parts by volume for use as a flavoring agent in cooking.

Example 3

If Example 1 is repeated, with 1,2,3,5-tetrathiane 1 part by weight being used instead of lenthionine 0.2 part by weight to obtain powder 1500 parts by weight essentially like results are obtained.

Example 4

In Example 2, the use of 1,2,4,6-tetrathiepane 10 parts by weight instead of lenthionine 1 part by weight yields a similarly useful powder product.

Example 5

To a mixture of table salt 4 parts by weight, sugar 1 part by weight, citric acid 0.01 part by weight, monosodium glutamate 0.3 part by weight, powdery amino acid mixture 0.8 part by weight, disodium 5'-inosinate 0.015 part by weight and powdery fat 0.6 part by weight is added 1,2,4,5-tetrathiane 0.0010 part by weight. The obtained mixture is dissolved in hot-water 400 parts by volume to give soup suitable for Chinese noodle soup.

Example 6

One part by weight of vinegar and 2 parts by weight of salad-oil containing 0.002% of lenthionine are mixed thoroughly. A suitable spice (pepper, paprika) is added to the mixture to obtain salad-dressing (pH 2.7).

Example 7

Sorbitol 400 parts by weight and citric acid 1 part by weight are dissolved in water to make the whole volume 1000 parts by weight, and then lenthionine 0.015 part by weight is dissolved in the aqueous solution to obtain an aroma enhancer (pH 2.9).

Example 8

In 1000 parts by weight of propylene glycol, one part by weight of lactic acid and 3 parts by weight of lenthionine are dissolved to obtain an aroma enhancer.

Example 9

To Shoyu, 1% of lactic acid and 0.001% of lenthionine are added and then the mixed solution is heated to obtain Shoyu diffusing good aroma of lenthionine (pH 4.2).

Example 10

Monosodium glutamate 40 parts by weight, a mixture of disodium 5'-inosinate and disodium 5'-guanylate 10 parts by weight and sorbitol 400 parts by weight are dissolved in water to obtain 1000 parts by volume of aqueous solution, in which citric acid 15 parts by weight is dissolved. In thus-obtained aqueous solution lenthionine 0.01 part by weight is further dissolved to obtain a liquid flavor enhancer diffusing the aroma of lenthionine (pH 4.1).

Example 11

(I) Flavor compositions used:
(A) Flavor composition A.—A solution of 1 part by weight of lenthionine in 1000 parts by volume of propylene glycol.
(B) Flavor composition B.—A beadlet (fine granule) containing 0.0075 part by weight of lenthionine in 1 part by weight of hydrogenated oil which is obtained by hydrogenating a mixture of soybean oil and safflower oil.

(II) Example for cooking:
(1) Roast meat.—Flavor composition A (1 part by volume) or B (0.15 part by weight) is spread on 200 parts by weight of pork. After standing for a short time, the meat is roasted.
(2) Fried mixture of pork and vegetable (Chinese dish).

Material

Pork—300 parts by weight
Shoyu—10 parts by volume
Starch powder—20 parts by weight
Sweet pepper—50 parts by weight
Carrot—50 parts by weight
Bamboo shoot—one (medium)
Ginger—one (small)
Welsh onion—one bundle.

Method

Pork is chopped into small pieces, and Shoyu and then starch powder are spread on the chopped meat. Sweet pepper, carrot, bamboo shoot, ginger and welsh onion are cut into small pieces, then cooked with flavor composition A (4 parts by volume) or B (0.75 part by weight) in a frying pan and seasoned with the following materials:

Oil—200 parts by volume
Sake—40 parts by volume
Shoyu—30 parts by volume
Sugar—20 parts by weight mixed 5'-nucleotide—0.5 part by weight (disodium 5'-inosinate:disodium 5'- guanylate=1:1).

What is claimed is:

1. A flavoring composition for foodstuffs, which consists essentially of a minor but aromatically and gustatorily effective amount of a compound of the formula:

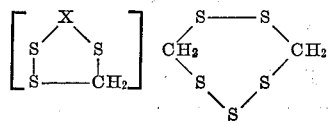

and a major amount of an edible carrier for such compound.

2. A flavoring composition for foodstuffs, which consists essentially of a compound of the formula

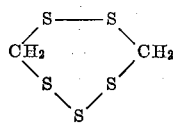

and an edible carrier for such compound, said compound consisting of from about 0.002 to about 2.0% by weight of the composition.

References Cited

UNITED STATES PATENTS

| 2,505,811 | 5/1950 | Szuecs | 99—140 |
| 2,657,198 | 10/1953 | Davis | 260—327 XR |

FOREIGN PATENTS

| 1,502,924 | 11/1967 | France. |

OTHER REFERENCES

Morita et al.: Chem. and Pharm. Bull., vol. 15, No. 7, 1967, pp. 988–993.

MAURICE W. GREENSTEIN, Primary Examiner

U.S. Cl. X.R.

99—54, 85, 107, 124; 260—327

UNITED STATES PATENT OFFICE
CERTIFICATE OF CORRECTION

Patent No. 3,503,758   Dated March 31, 1970

Inventor(s) SHYOSO WADA ET AL

It is certified that error appears in the above-identified patent and that said Letters Patent are hereby corrected as shown below:

In claim 1, line 4 of the patent, please cancel the formula

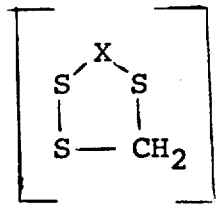

Signed and sealed this 18th day of May 1971.

(SEAL)
Attest:

EDWARD M. FLETCHER, JR.
Attesting Officer

WILLIAM E. SCHUYLER, JR.
Commissioner of Patents